(12) United States Patent
Lee et al.

(10) Patent No.: US 7,164,823 B2
(45) Date of Patent: Jan. 16, 2007

(54) OPTICAL ISOLATOR USING PHOTONIC CRYSTAL

(75) Inventors: Hong-seok Lee, Seongnam-si (KR); Ji-deog Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/316,842

(22) Filed: Dec. 27, 2005

(65) Prior Publication Data
US 2006/0140539 A1 Jun. 29, 2006

(30) Foreign Application Priority Data
Dec. 24, 2004 (KR) ............ 10-2004-0112236

(51) Int. Cl.
*G02B 6/42* (2006.01)
(52) U.S. Cl. .................. 385/43; 385/11; 385/24; 385/129; 359/484
(58) Field of Classification Search .......... 385/11, 385/15, 24, 27, 31, 37, 39–46, 49, 129; 359/280, 359/281, 484
See application file for complete search history.

(56) References Cited
U.S. PATENT DOCUMENTS
6,813,399 B1 * 11/2004 Hamada .............. 385/11
6,934,441 B1 * 8/2005 Toney .............. 385/24

OTHER PUBLICATIONS

Pottier P et al. "Photonic crystal continuous taper for low-loss direct coupling into 2D photonic crystal channel waveguides and further device functionality", Optics Communications, North-Holland Publishing Co. Amsterdam, NL, vol. 223, No. 4-6, Aug. 1, 2003, pp. 339-347, XP004443888.
Happ T D et al., "Photonic Crystal Tapers For Ultracompact Mode Conversion", Optics Letters, OSA, Optical Society Of America, Washington, DC, US, vol. 26, No. 14, Jul. 15, 2001, pp. 1102-1104, XP001103642.

* cited by examiner

*Primary Examiner*—Phan Palmer
(74) *Attorney, Agent, or Firm*—Sughrue Mion, PLLC

(57) ABSTRACT

An optical isolator using a photonic crystal. The optical isolator includes an input portion that in turn includes an input waveguide part and an input waveguide having a taper portion formed in the input waveguide part. An output portion includes an output waveguide part and an output waveguide formed in the output waveguide part continuously with the input waveguide. The output waveguide includes a backward directional optical signal shield surface having an inclination greater than the taper portion with respect to an optical signal transmission center axis. The optical isolator is operable to have an optical signal substantially transmitted in a forward direction from the input portion to the output portion and further operable to substantially not transmit the optical signal in a backward direction from the output portion to the input portion.

25 Claims, 10 Drawing Sheets

OPTICAL ISOLATOR USING PHOTONIC CRYSTAL

CROSS-REFERENCE TO RELATED PATENT APPLICATIONS

This application claims the benefit of Korean Patent Application No. 10-2004-0112236, filed on Dec. 24, 2004, in the Korean Intellectual Property Office, the disclosure of which is incorporated herein in its entirety by reference.

BACKGROUND OF THE INVENTION

1. Field of the Invention

The present invention relates to an optical isolator, and more particularly, to an optical isolator in which isolation is improved and which can be made compact by changing the structure of a photonic crystal.

2. Description of the Related Art

An optical isolator is an irreversible optical element that transmits an optical signal with almost no attenuation in a forward direction and prevents transmission of the optical signal in a reverse direction by dispersing the light. The optical isolator utilizes a phenomenon that an electromagnetic wave propagating parallel to a magnetic field in a dielectric effected by the magnetic field gradually rotates on a polarized surface thereof using the Faraday effect generally seen in a special dielectric in a magnetic filed. When the directions of the magnetic field and the electromagnetic wave are quite opposite, the polarized surface reversely rotates according to the direction of propagation of the electromagnetic wave. When an element such as a polarization plate for passing only an electromagnetic wave on the polarized surface is placed at both sides, an electromagnetic wave in one direction passes well, but an electromagnetic wave in the opposite direction does not pass.

Thus, the optical isolator can prevent the deterioration of a transmission efficiency or damage to optical parts by blocking the reflected optical signal from the optical system.

Referring to FIG. 1, a conventional optical isolator using a polarization mode includes a polarizer 10, a Faraday rotator 13, and an analyzer 15. A light ray $L_1$ propagating in a forward direction has a polarization by the polarizer 10. The polarization of each of light ray $L_1$ having passed through the polarizer 10 is rotated by 45° by the Faraday rotator 13.

The analyzer 15 has a crystal optical axis twisted by 45° in the same direction as the direction in which the light ray $L_1$ is rotated by the Faraday rotator 13 with respect to the crystal optical axis of the polarizer 10. Accordingly, the light ray $L_1$ having passed through the polarizer 10 and the Faraday rotator 13 passes through the analyzer 15. Thus, the light ray $L_1$ propagating in the forward direction passes through the polarizer 10, the Faraday rotator 13, and the analyzer 15.

On the contrary, a light ray $L_2$ propagating in the opposite direction has polarization twisted by 45° by the analyzer. While passing through the Faraday rotator 13, the light ray $L_2$ propagating in the opposite direction is rotated by 45° in a direction opposite to the direction in which the forward directional light ray $L_1$. Thus, the reverse directional light ray $L_2$ having passed through the Faraday rotator 13 has a polarization perpendicular to the crystal optical axis of the polarizer 10. Therefore, the reverse directional light ray $L_2$ is blocked by the polarizer 10 after passing through the Faraday rotator 13.

The polarizer 10 makes an input light ray have one polarization and the Faraday rotator 13 rotates the polarization of the separated light by 45°. The analyzer 15 is arranged in the optical axis direction of 45° with respect to the polarizer 10 and blocks the light having passed the Faraday rotator 13. When the light is input in the opposite direction, the direction of the polarization determined by the analyzer 15 is rotated by (−)45° by the irreversible operation of the Faraday rotator 13 so that the polarization is changed to have a difference of 90° from the polarization of the polarizer 10. Thus, the reverse directional light ray $L_2$ is blocked by the polarizer 10.

The optical isolator is widely used in an optical communication system. When a transmission rate used in the optical communication system increases, performance required for a laser increases as well. Light retro-reflected in part of the optical communication system has a bad effect on the operation of a high performance laser so that the spectrum, line width, or natural noise of the laser is changed. The optical isolator is used to protect a high performance semiconductor laser by restricting the generation of reflective noise generated when light is retro-reflected to the laser. Also, in a dense wavelength division multiplexing method, various optical signals having different wavelengths are simultaneously transmitted through an optical fiber so that transmission capacity is increased, a system cost is reduced, and an efficient network is established. Thus, with a remarkable growth of an ultra-broadband information communication market including an asynchronous digital subscriber network, a need for the optical isolator is drastically increasing over the world. In the dense wavelength division multiplexing method, since the spectrum line width of a light source decreases, maintaining the decreased spectrum line width is important. Also, as integration of optical parts is performed, the structure of the optical isolator needs to be simplified. However, since the conventional optical isolator using the polarizer and the Faraday rotator needs more number of parts and the structure thereof becomes complicated, an optical arrangement is difficult.

SUMMARY OF THE INVENTION

To solve the above and/or other problems, the present invention provides an optical isolator using a photonic crystal. The optical isolator includes an input portion including an input waveguide part and an input waveguide having a taper portion formed in the input waveguide part. An output portion includes an output waveguide part and an output waveguide formed in the output waveguide part continuously with the input waveguide. The output waveguide includes a backward directional optical signal shield surface having an inclination greater than the taper portion with respect to an optical signal transmission center axis. The optical isolator is operable to have an optical signal substantially transmitted in a forward direction from the input portion to the output portion and further operable to substantially not transmit the optical signal in a backward direction from the output portion to the input portion.

In a specific enhancement, the optical isolator further comprises a connection waveguide between the input waveguide and the output waveguide.

In another specific enhancement, the photonic crystal comprises a plurality of holes or rods and the connection waveguide has a width that is substantially the same as a diameter of each of the holes or rods.

In another specific enhancement the photonic crystal comprises a plurality of holes or rods and the connection waveguide has a length in which three through six holes or rods are arranged in a row.

In another specific enhancement, a block having a first surface facing the backward directional optical signal shield surface and a second surface facing a side surface of the output waveguide is arranged at an inlet side of the output waveguide with respect to the forward direction and a narrow waveguide is formed between the backward directional optical signal shield surface and the first surface, and the side surface and the second surface, so that an optical signal propagating from the input waveguide toward the output waveguide is operable to be guided through the narrow waveguide and an optical signal propagating from the output waveguide toward the input waveguide is operable to be reflected by the block.

In yet another specific enhancement, the photonic crystal comprises a plurality of holes or rods and a protruding portion is further provided adjacent to the block, said protruding portions including the holes or rods arranged in a row on the side surface of the output waveguide.

In yet another specific enhancement, the backward directional optical signal shield surface comprises a plurality of holes or rods of the photonic crystal to form a surface that makes a right angle with respect to the optical signal transmission center axis.

In still another specific enhancement, the backward directional optical signal shield surface comprises a plurality of holes or rods of the photonic crystal having a tapered shape increasing along the forward direction with respect to the optical signal transmission center axis.

In still another specific enhancement, the backward directional optical signal shield surface has a tapered shape increasing along the backward direction with respect to the optical signal transmission center axis.

In yet another specific enhancement the taper portion comprises a plurality of holes or rods of the photonic crystal in a step shape.

Another aspect of the invention is an optical isolator using a photonic crystal. The optical isolator includes an input waveguide having a taper portion formed in the input waveguide part. An output waveguide is formed in the output waveguide part continuously with the input waveguide. The output waveguide comprises a backward directional optical signal shield surface. The optical isolator is operable to have an optical signal substantially transmitted in a forward direction and substantially preventing transmission of the optical signal in a backward direction.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

A photonic crystal is an artificial crystal in which a photonic band gap (PBG) is formed in the energy spectrum of an electromagnetic wave by periodically arranging substances having different dielectric constants. When light is coupled to the photonic crystal, the light passes through the photonic crystal for most wavelengths. However, a reflection area through which the light cannot pass is generated in a particular wavelength (or frequency) band, which is referred to as the PBG. When the light having a wavelength (or frequency) belonging to the PBG is incident to the inside of the photonic crystal, the light is not propagated in the photonic crystal and is reflected therefrom. Accordingly, the light can be confined in a cavity or a waveguide by using the PBG.

Figure 1:
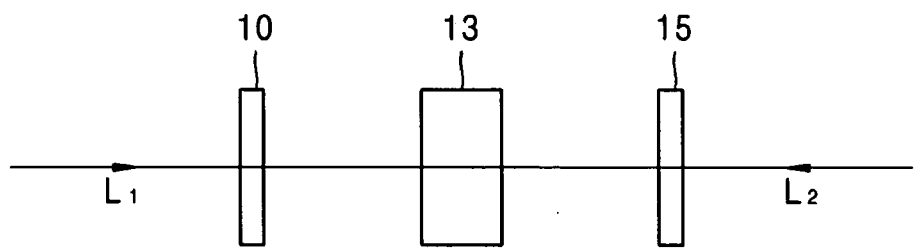
FIG. 1 is a view illustrating a conventional optical isolator.
Figure 2A:
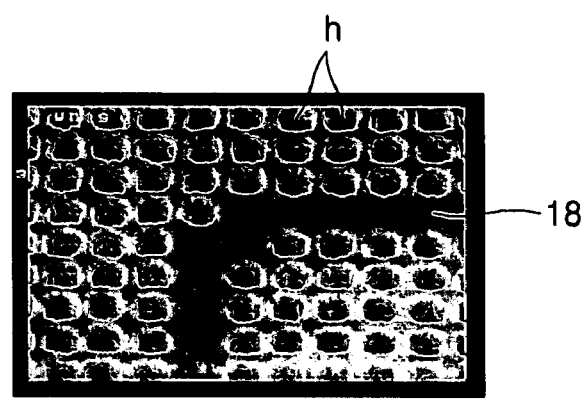
FIG. 2A is an image illustrating a 2-dimensional photonic crystal structure.
Figure 2B:
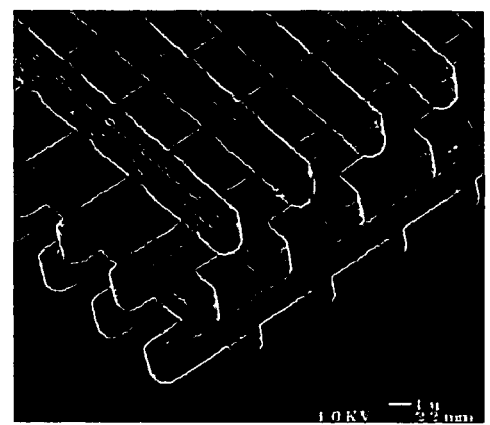
FIG. 2B is an image illustrating a 3-dimensional photonic crystal structure.

The photonic crystal is formed by periodically arranging dielectric substances. The size and position of the PBG vary according to the refractive index and the periodic structure. By using this property, the photonic crystal can be applied to optical elements such as a branch filter, an optical waveguide, an optical delay element, and a laser. FIGS. 2A and 2B illustrate examples of a 2-dimensional photonic crystal structure and a 3-dimensional photonic crystal structure, respectively. The photonic crystal can be divided into a hole type photonic crystal in which holes are periodically arranged and a rod type photonic crystal in which rods are periodically arranged. In FIG. 2A, holes "h" are periodically arranged and a portion without holes is a waveguide area 18.

Figure 3A:
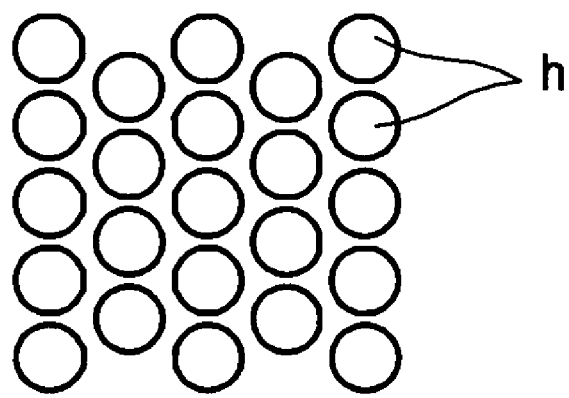
FIG. 3A is a view illustrating a hole type photonic crystal having a triangular grid structure.
Figure 3B:
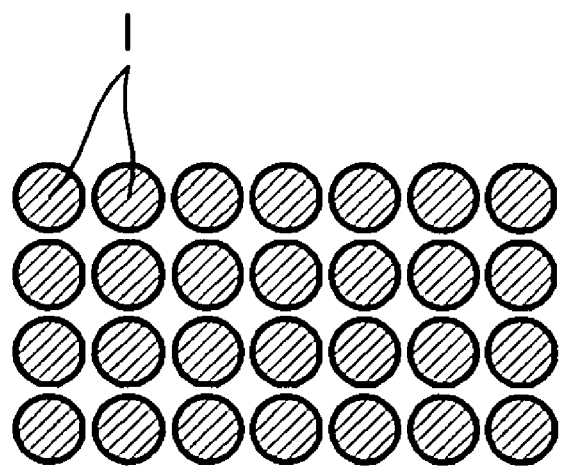
FIG. 3B is a view illustrating a rod type photonic crystal having a rectangular grid structure.

FIG. 3A shows that a photonic crystal has a triangular grid structure. FIG. 3B shows that a photonic crystal has a rectangular grid structure. In the triangular grid structure, a plurality of rows of the holes "h" or rods "l" are arranged zigzag while the rows of the holes "h" or rods "l" are arranged in the rectangular grid structure. Although not shown in the drawings, the rod "l" may be arranged in the triangular grid structure or the holes "h" may be arranged in the rectangular grid structure.

Figure 4:
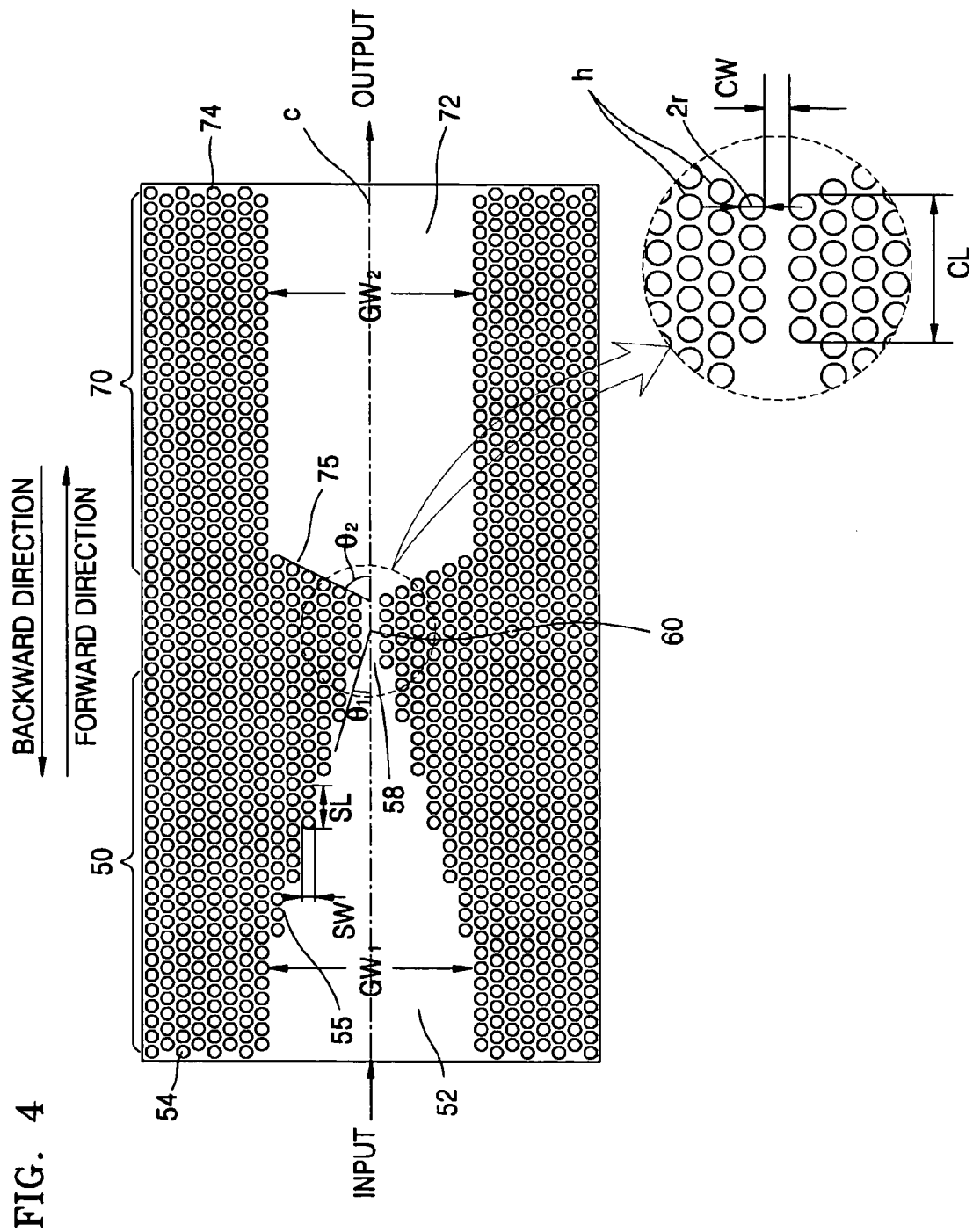
FIG. 4 is a view illustrating an optical isolator according to a first embodiment of the present invention.

It is a characteristic feature of the present invention that isolation is improved by changing the structure of the photonic crystal employed in an optical isolator. Referring to FIG. 4, an optical isolator according to a first embodiment of the present invention includes an input portion 50 in which an optical signal is coupled and an output portion 70 from which the optical signal exits. The input portion 50 receives the optical signal from an external fiber or waveguide (not shown). The optical signal from the input portion 50 is transmitted from the output portion 70 to another external fiber or waveguide (not shown). The direction from the input portion 50 to the output portion 70 is referred to as a forward direction while the direction from the output portion 70 to the input portion 50 is referred to as a backward direction. The optical signal proceeds substantially without loss in the forward direction, but cannot proceed in the backward direction.

The input portion 50 includes an input optical waveguide part 54 formed of a photonic crystal such that an input waveguide 52 having a taper portion 55 which narrows in the forward direction is formed. In FIG. 4, a hole type photonic crystal structure is illustrated as an example. Since the input optical waveguide part 54 is formed of a photonic crystal and has a particular frequency band of the PBG, an optical signal corresponding to the PBG does not propagated in the input optical waveguide part 54 and is reflected to proceed through the input waveguide 52.

The taper portion 55 has a width decreasing in the forward direction. There are the hole type photonic crystal and the rod type photonic crystal as shown in FIGS. 3A and 3B. In the following embodiment, only the hole type photonic crystal structure in which the holes "h" are regularly arranged will be described. The same structure can be applied to the rod type photonic crystal.

The taper portion 55 is formed as a surface made by the holes "h" of the photonic crystal forms a step shape. For example, the taper portion 55 may be narrowed by one step for each of three holes "h" arranged in the forward direction. Accordingly, the taper portion 55 may be configured to be narrowed in the step shape by arranging the holes "h" in the step shape. The stepped structure of the taper portion 55 can be expressed by the length SL and width SW of the step. FIG. 4 illustrates an exemplary case in which the taper portion 55 has a ratio SL:SW=3:1. The number of steps can be adjusted according to the overall width and length of the isolator. In the meantime, an outlet 58 of the input waveguide 52 with respect to the forward direction may have the same width as the diameter "2r" of the hole "h".

The output portion 70 includes an output optical waveguide part 74 having a hole type photonic crystal structure and an output waveguide 72 formed of a different medium from the hole "h" of the photonic crystal in the output optical waveguide part 74. The output waveguide 72 is continuously connected to the input waveguide 52 and has a backward directional optical signal shield surface 75 adjacent to the outlet 58 of the input waveguide 52.

The backward directional optical signal shield surface 75 has an inclination greater than that of the taper portion 55 of the input waveguide 52 with respect to an optical signal transmission center axis "c". In other words, the taper portion 55 is formed to satisfy an inequality that $\theta_1 < \theta_2$ where $\theta_1$ is an inclination of the taper portion 55 with respect to the optical signal transmission center axis "c" and $\theta_2$ is an inclination of the backward directional optical signal shield surface 75 with respect to optical signal transmission center axis "c". The inclination $\theta_1$ of the taper portion 55 is an inclination of a surface formed by connecting the holes "h" arranged at the outermost surface with respect to the center axis "c". The inclination $\theta_2$ of the backward directional optical signal shield surface 75 is an inclination of a surface formed by connecting the holes "h" arranged at the outermost surface with respect to the center axis "c".

Figure 5A:
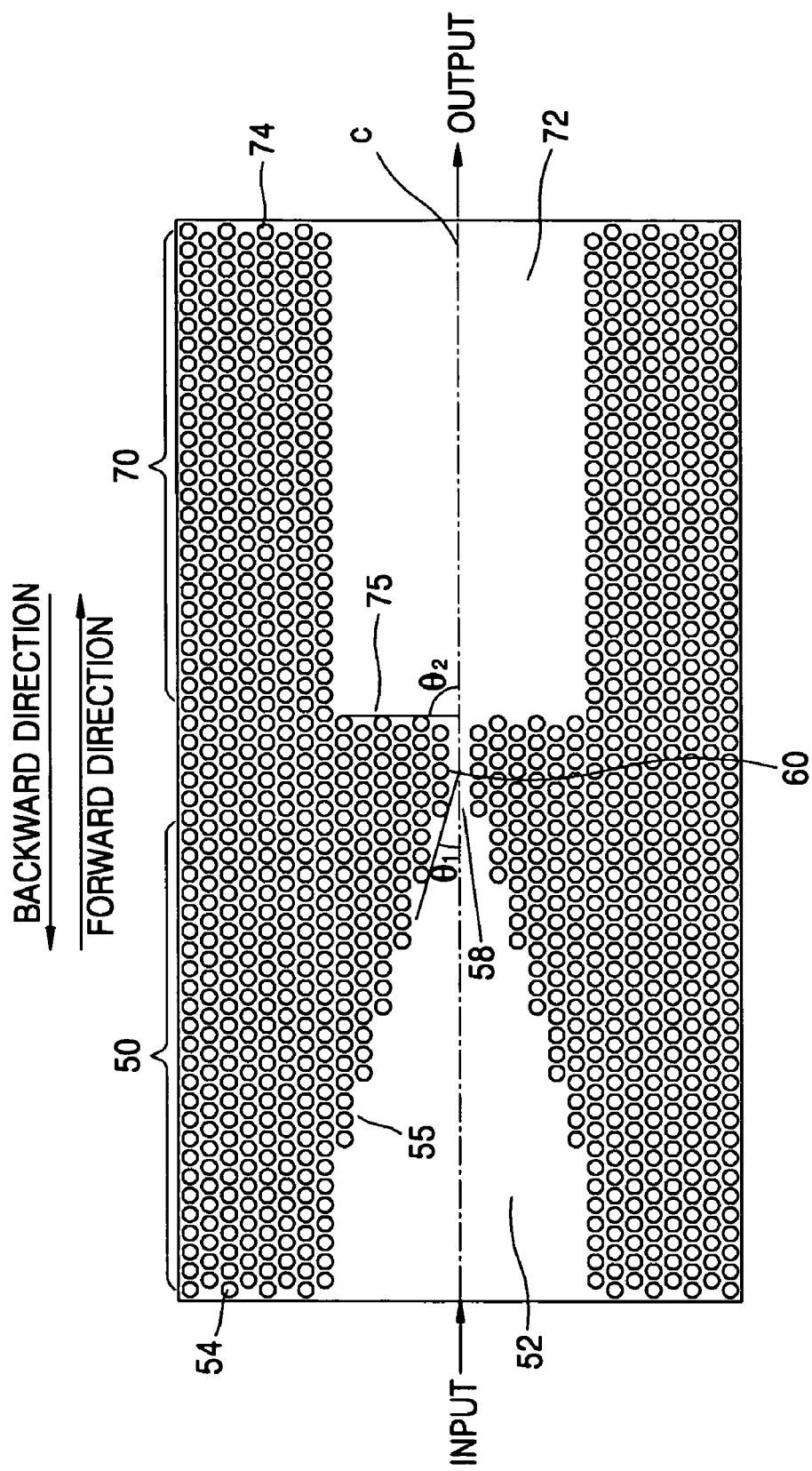
FIGS. 5A and 5B are views illustrating modified examples of the optical isolator of FIG. 4.
Figure 5B:
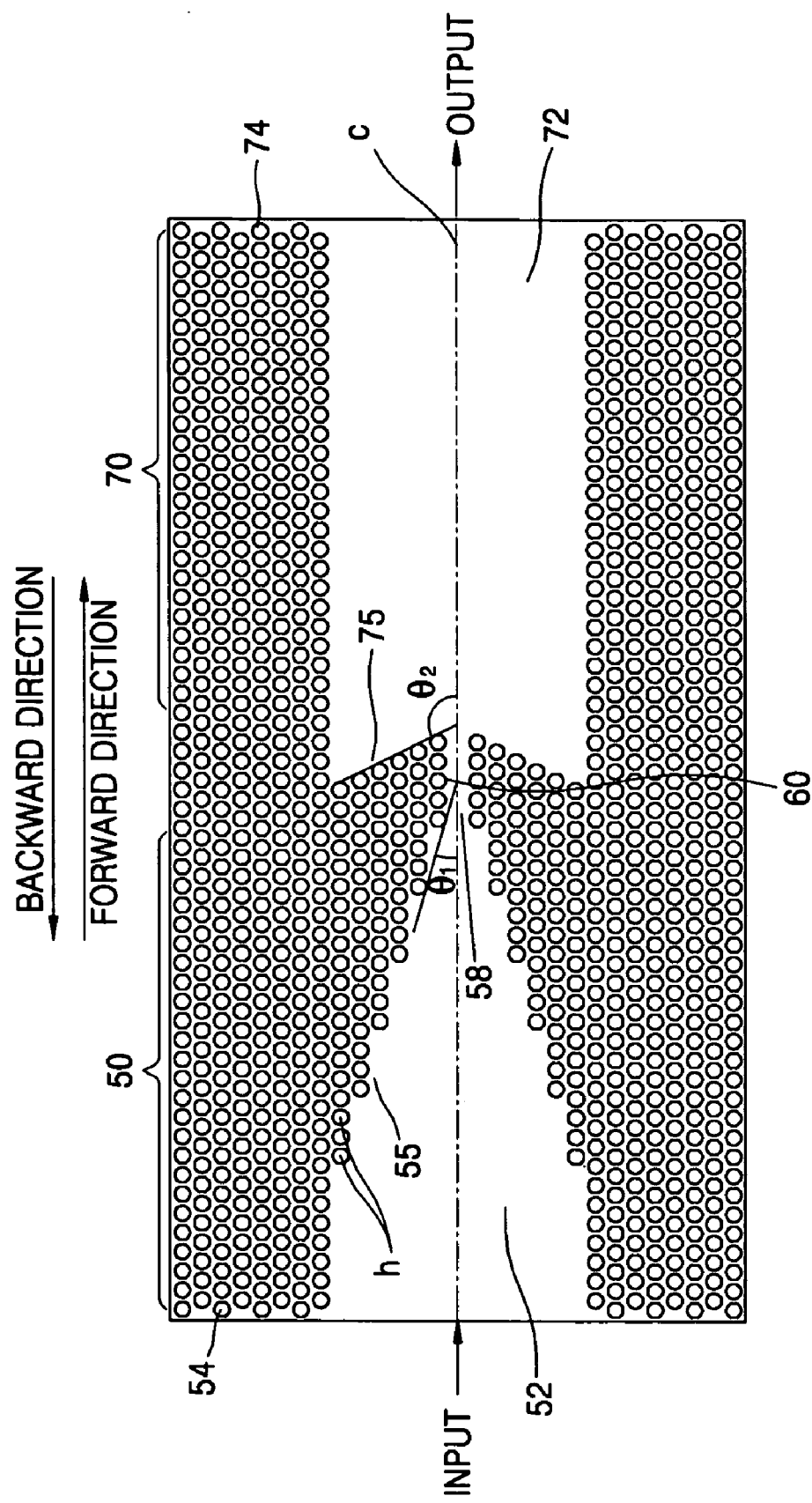

While satisfying the inequality $\theta_1 < \theta_2$, the backward directional optical signal shield surface 75 may let the angle $\theta_2$ have an acute angle, a right angle, or an obtuse angle. FIG. 4 illustrates a case of the angle $\theta_2$ having an acute angle. FIGS. 5A and 5B illustrate cases of the angle $\theta_2$ having a right angle and an obtuse angle, respectively.

The backward directional optical signal shield surface 75 may have various shapes according to the arrangement of the holes "h". As an example, as shown in FIG. 4, the backward directional optical signal shield surface 75 may have a tapered shape increasing in the forward direction. However, the inclination of the backward directional optical signal shield surface 75 is preferably very greater than that of the taper portion 55. As shown in FIG. 5A, the holes "h" may be arranged such that the backward directional optical signal shield surface 75 makes a right angle with respect to the optical signal transmission center axis "c". Also, as shown in FIG. 5B, the backward directional optical signal shield surface 75 may have a width increasing in the backward direction. The backward directional optical signal shield surface 75 is formed as the holes "h" of the photonic crystal are arranged in a certain structure.

The overall width $GW_1$ of the input waveguide 52 is preferably identical to the overall width $GW_2$ of the output waveguide 72. A connection waveguide 60 may further be provided between the input waveguide 52 and the output waveguide 72. The width CW of the connection waveguide 60 may have the same width as one in which one through three holes "h" are arranged. Also, the length CL of the connection waveguide 60 may be the same as one in which one through seven holes "h" are arranged.

Figure 6:
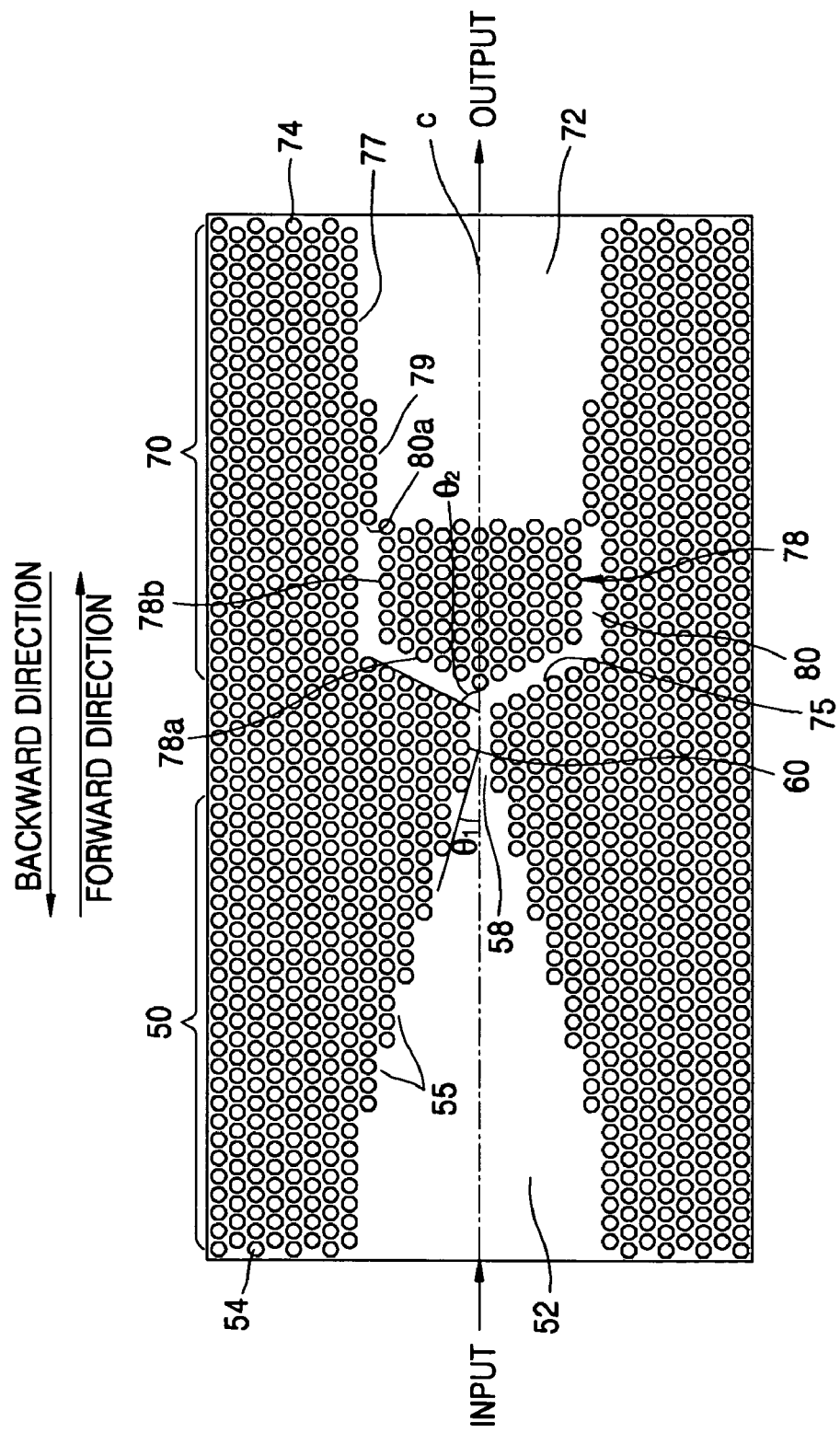
FIG. 6 is a view illustrating an optical isolator according to a second embodiment of the present invention.

FIG. 6 shows an optical isolator according to a second embodiment of the present invention. To further improve isolation, a block 78 may be added at an inlet side of the output portion 70 in the forward direction as shown in FIG. 6. The isolation, which indicates the performance of an isolator is defined as a ratio of intensities of forward and backward transmitted optical signal as a "dB" value.

The output portion 70 includes the backward directional optical signal shield surface 75 and a side surface 77. The block 78 includes a first surface 78a facing the backward directional optical signal shield surface 75 and a second surface 78b facing the side surface 77. As the holes "h" are arranged to form the block 78, a narrow waveguide 80 is formed between the first surface 78a and the backward directional optical signal shield surface 75, and the second surface 78b and the side surface 77. The optical signal proceeding from the input waveguide 52 toward the output waveguide 72 is guided by the narrow waveguide 80. The optical signal proceeding from the output waveguide 72 toward the input waveguide 52 is reflected by the block 78 so that the optical signal is prevented from being transmitted in the backward direction.

The taper portion 55 allows the optical signal to proceed by being converted to a state in which loss in the conversion is small by means of an adiabatic mode conversion so that the optical signal is transmitted well in the forward direction while a very small amount of the optical signal is transmitted because the mode is abruptly changed when the optical signal is transmitted in the backward direction. That is, when the optical signal proceeds in the forward direction, since the waveguide is tapered, the conversion of a mode is minute so that loss is hardly generated due to the mismatch of mode. When the optical signal proceeds in the backward direction, since the loss due to the mode mismatch is great, most of the optical signal doss not proceed. Furthermore, the amount of the optical signal transmitted in the backward direction can further be reduced by the block 78.

The narrow waveguide 80 has the same width as one in which one through 2 holes "h" are arranged. Also, a protruding portion 79 is formed on the side surface 77. The protruding portion 79 is formed by arranging the holes "h" in a row to be adjacent to an end portion of the narrow waveguide 80. The protruding portion 80 has the same width as the narrow waveguide 80. The protruding portion 79 can be formed by arranging the holes "h" in one through two rows and three through ten columns. That is, when the radius of the hole "h" is "r", the protruding portion 79 has the almost same width as a width equivalent to the diameter "2r" of the hole "h", or "4r", and a length of "6r" through "20r".

As described above, in the optical isolator according to the present invention, isolation is improved by changing a photonic crystal structure. Also, there is no need to include a waveguide separately from the isolator. The optical isolator can be integrated with a laser diode so that a compact structure is available. Also, since the optical isolator can be made into a signal part by using the photonic crystal structure, an optical arrangement and an assembly process are not needed and the manufacturing cost is reduced.

Figure 7:
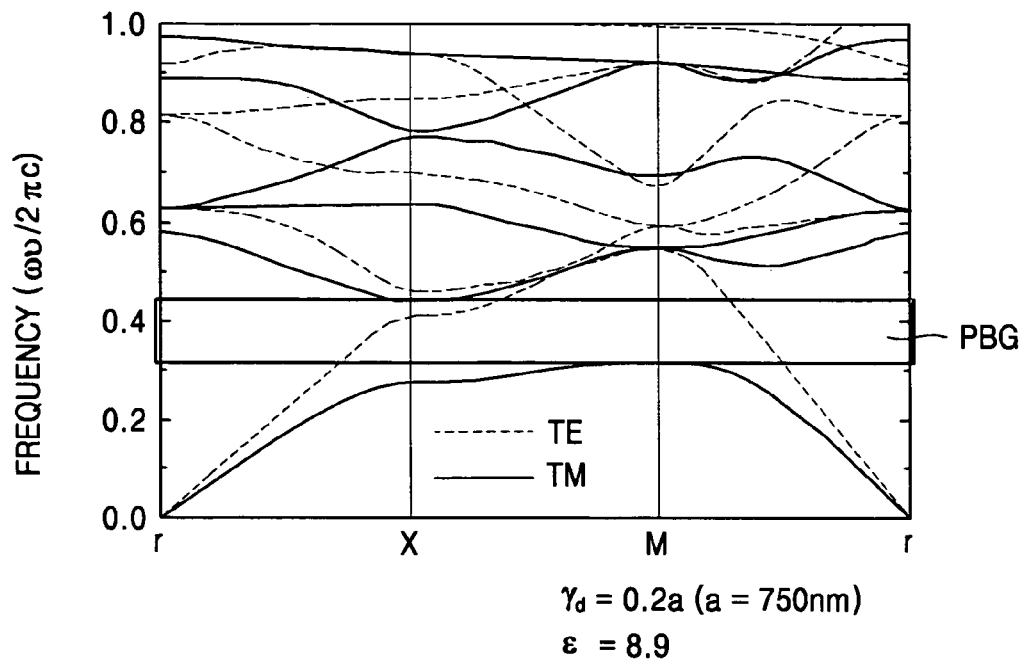
FIG. 7 is a graph showing a photonic band gap of the photonic crystal.

FIG. 7 is a graph showing a photonic band gap (PBG) in a particular frequency band of a photonic crystal structure. In the graph, "γd" denotes the radius of a hole, "a" denotes a distance between the centers of the neighboring holes (a=750 nm), "ϵ" denotes a dielectric constant of a medium, "TE" denotes a TE mode light, and "TM" denotes a TM mode light.

Figure 8:
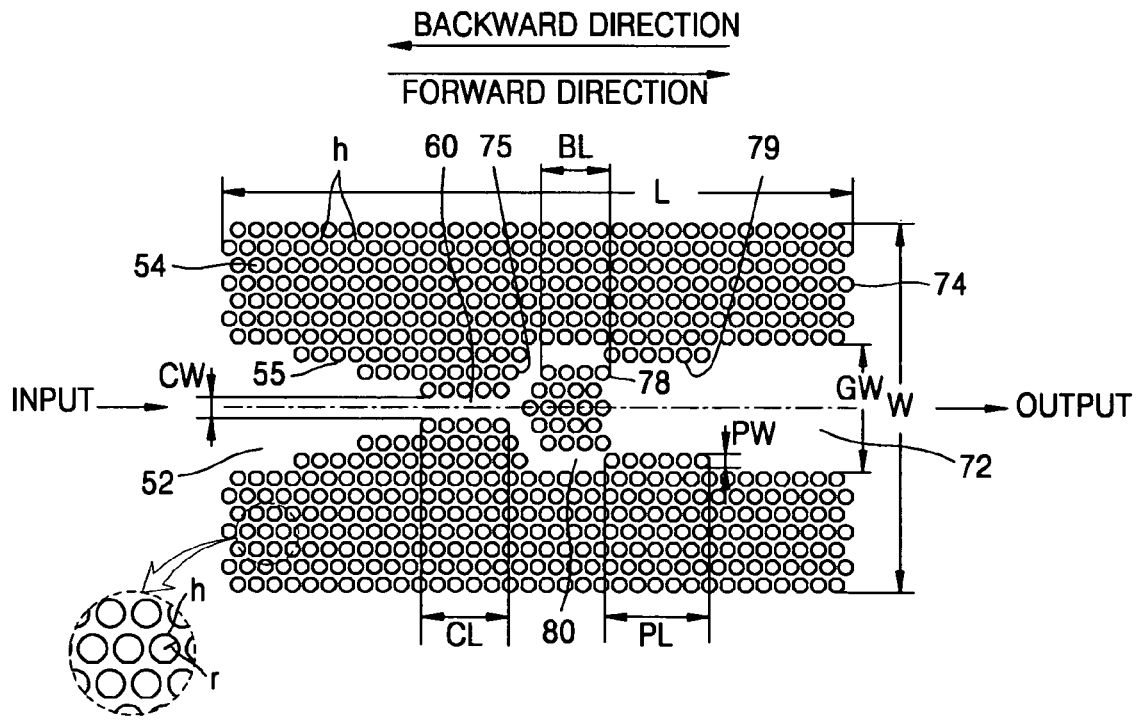
FIG. 8 is a view illustrating a modified example of the optical isolator of FIG. 6.

Referring to FIG. 8, factors to change the photonic crystal structure in the present invention includes the radius "r" of the hole "h" (or the rod "l"), the overall length "L" of the isolator, the overall width "W", the refractive index "n" of a photonic crystal medium, the crystal grid structure, the step structure of the taper portion, the length "BL" of the block, the length "CL" of the connection waveguide, the width "CW" of the connection waveguide, the overall width "GW" of the optical waveguide, the length "PL" of the protruding portion, and the width "PW" of the protruding portion. The arrangement structure of the holes or rods of the photonic crystal constituting the taper portion is shown as an example of a step structure. However, a variety of arrangement structures in addition to the step structure can be used.

Next, under the conditions that a normalized frequency is 0.5, the PBG is provided at 1.5 μm, and a=750 nm, an example of a photonic crystal structure is designed as shown in Table 1 for simulation.

TABLE 1

| Factor | Value |
| --- | --- |
| Hole Radius (r) | 0.48a |
| Overall Length (L) | 35a |
| Overall Width (W) | 21a |
| Refractive Index (n) | 3.376 |
| Grid Structure | Triangular Structure |
| Waveguide Width (GW) | 7a |
| Taper Portion Structure | 3:1 |
| Block Length (BL) | 4(2r) |
| Connection Waveguide Length (CL) | 5(2r) |
| Connection Waveguide Width (CW) | 2r |
| Edge Shape | Rectangular |
| Protruding Portion Length (PL) | 6(2r) |
| Protruding Portion Width (PW) | 1(2r) |

Figure 9A:
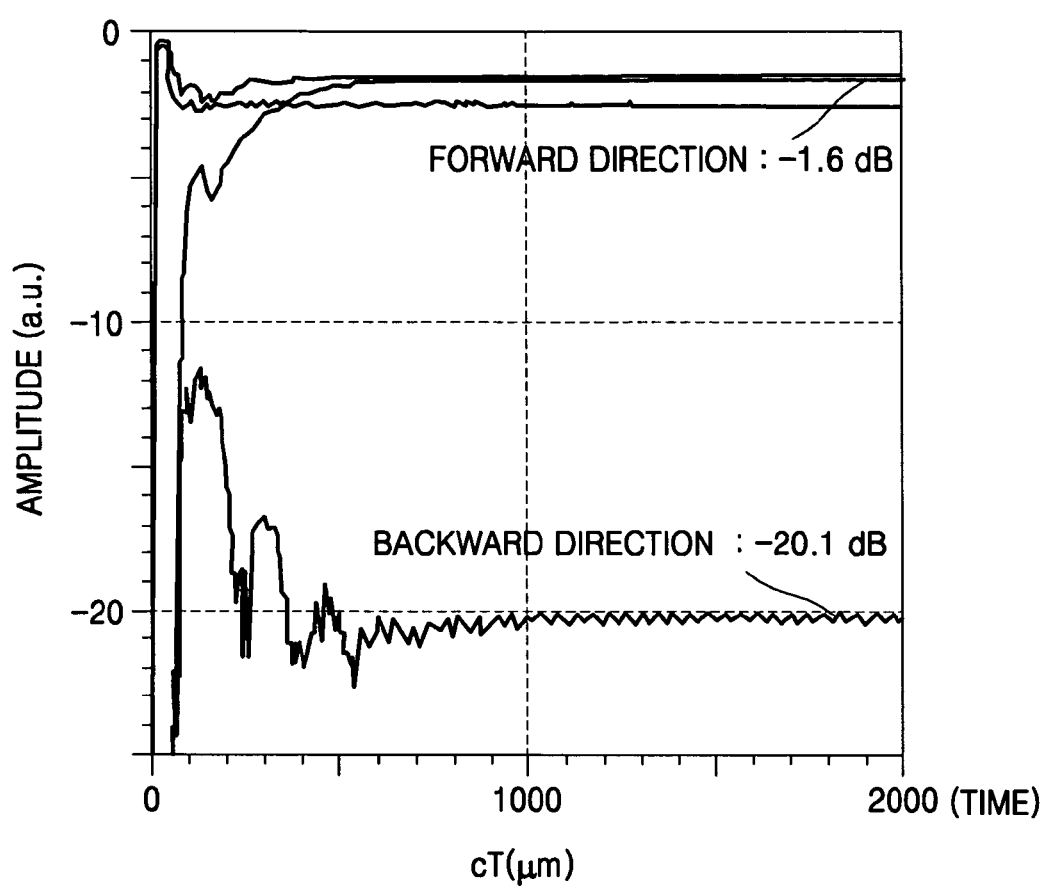
FIG. 9A is a graph showing the amplitudes of a forward directional optical signal and a backward directional optical signal of an optical isolator having a photonic crystal structure shown in Table 1.

The amplitudes of the optical signals in the forward and backward directions of the isolator having the photonic crystal structure according to Table 1 are shown in FIG. 9A. The amplitude of the optical signal in the forward direction is −1.6 (dB), the amplitude of the optical signal in the backward direction is −20.1 (dB), and isolation is about 37.0 (dB). In Table 1, the block length BL is equivalent to a length of arrangement of four holes, the connection waveguide length CL is equivalent to a length of arrangement of five holes, and the connection waveguide width CW equivalent to a width of the diameter of a hole.

Isolation is calculated by changing the photonic crystal structure as follows.

TABLE 2

| Factor | Value |
| --- | --- |
| Hole Radius (r) | 0.48a |
| Overall Length (L) | 82a |
| Overall Width (W) | 27a |
| Refractive Index (n) | 3.376 |
| Grid Structure | Triangular Structure |
| Waveguide Width (GW) | 13a |
| Taper Portion Structure | 5:1 |
| Block Length (BL) | 7(2r) |
| Connection Waveguide Length (CL) | 5(2r) |
| Connection Waveguide Width (CW) | 2r |
| Edge Shape | Rectangular |
| Protruding Portion Length (PL) | 7(2r) |
| Protruding Portion Width (PW) | 1(2r) |

Figure 9B:
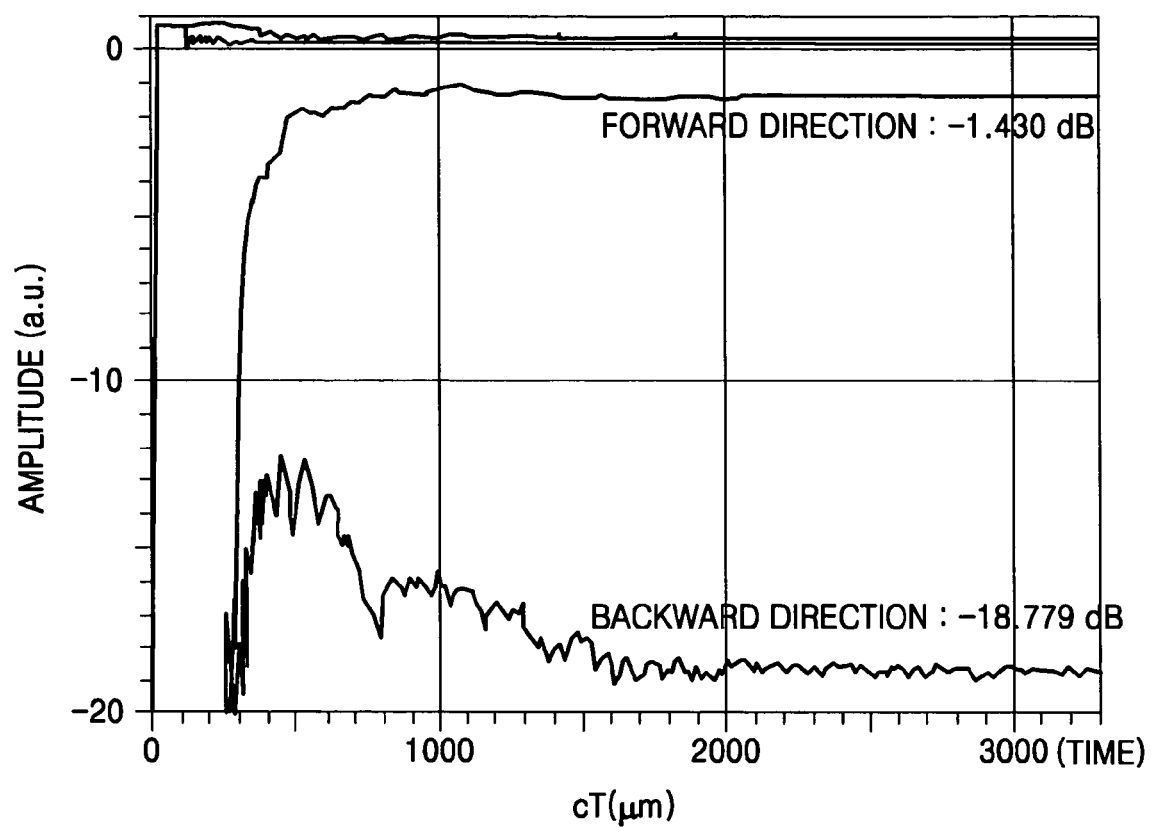
FIG. 9B is a graph showing the amplitudes of a forward directional optical signal and a backward directional optical signal of an optical isolator having a photonic crystal structure shown in Table 2.

The amplitudes of the optical signals in the forward and backward directions of the isolator having the photonic crystal structure according to Table 2 are shown in FIG. 9B. The amplitude of the optical signal in the forward direction is −1.430 (dB), the amplitude of the optical signal in the backward direction is −18.698 (dB), and isolation is about 34.7 (dB).

Figure 10:
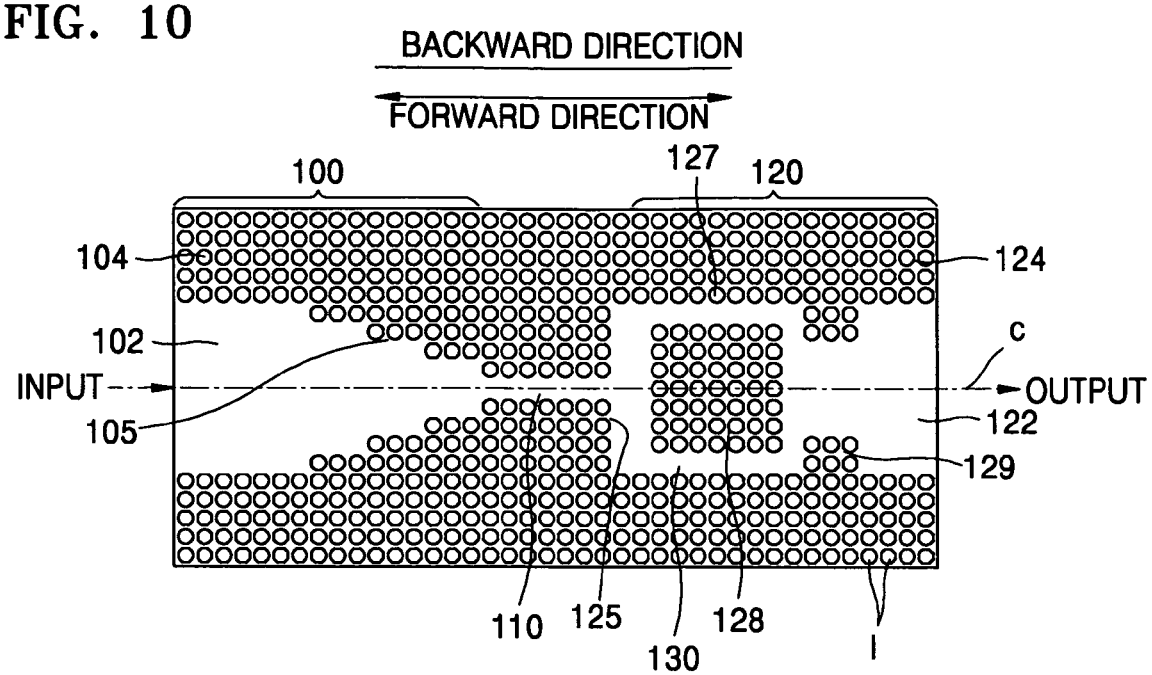
FIG. 10 is a view showing an example of the optical isolator according to the present invention which is formed of a photonic crystal having a rectangular grid structure.

FIG. 10 shows an isolator having a rod type photonic crystal structure in which the rods "l" are arranged in a rectangular grid structure. The isolator having a rod type photonic crystal structure can be manufactured to have the same structure as the above-described isolator having the hole type photonic crystal structure. The isolator shown in FIG. 10 includes an input portion 100 and an output portion 200. The input portion 100 includes an input waveguide part 104 where an input waveguide 102 having a taper portion 105 of a step shape is formed. The output portion 200 includes an output waveguide part 124 where an output waveguide 122 having a backward directional optical signal shield surface 125 of a step shape is formed. A connection waveguide 110 is formed between the input portion 100 and the output portion 200. A block 128 having a surface corresponding to the backward directional optical signal shield surface 125 is formed to face the backward directional optical signal shield surface 125. A narrow waveguide 130 is formed between the backward directional optical signal shield surface 125 and the block 128, and a side surface 127 of the output waveguide 122 and the block 128. A protruding portion 129 is formed adjacent to an end portion of the narrow waveguide 130. The protruding portion 129 is formed by arranging the rods "l" in two rows and three columns. The backward directional optical signal shield surface 125 makes a right angle with respect to the optical signal transmission center axis "c".

Figure 11:
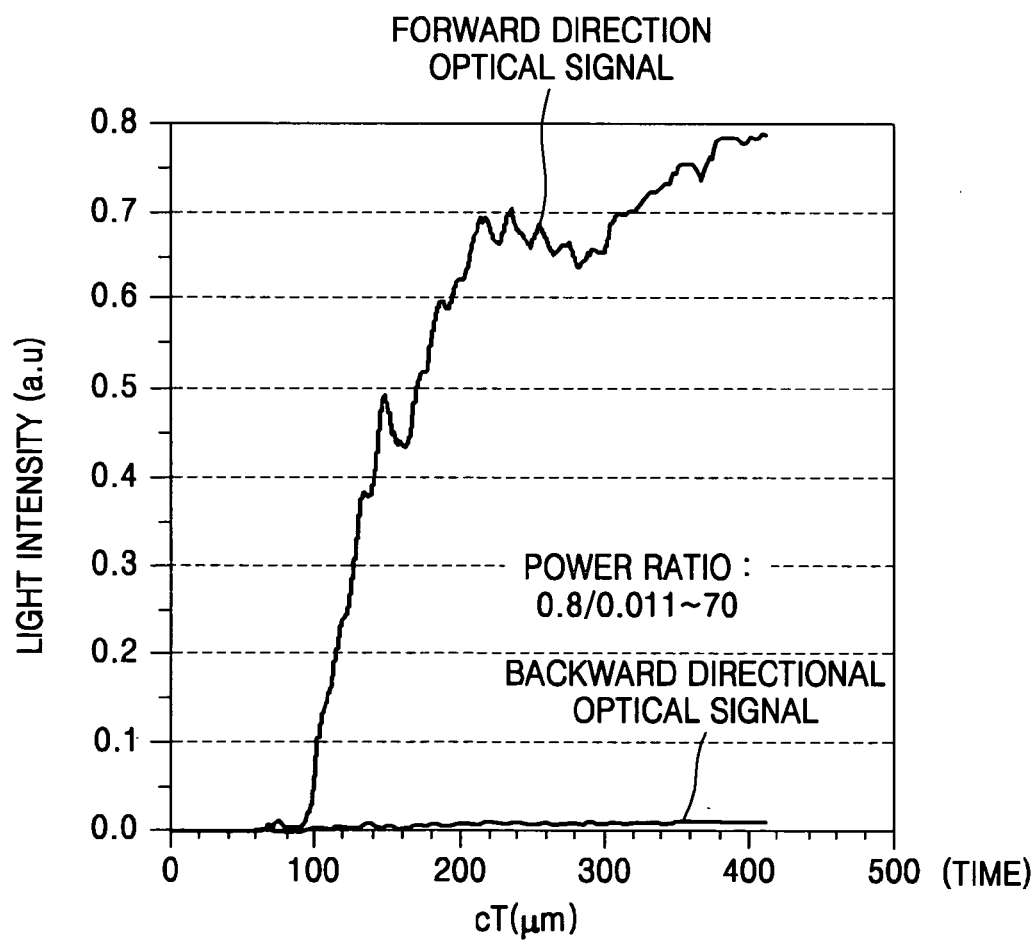
FIG. 11 is a graph showing the intensity of an optical signal with respect to the optical isolator of FIG. 10.

FIG. 11 is a graph showing the intensity of an optical signal with respect to the isolator having the rod type photonic crystal structure, in which the intensities of optical signals in the forward and backward directions are shown. While the intensity of the optical signal in the forward direction is up to about 0.8, that in the backward direction indicates less than 0.1. Thus, it can be seen that the rod type photonic crystal structure can function as an isolator. The optical isolator according to the present invention can be embodied using not only the hole type photonic crystal structure but also the rod type photonic crystal structure.

As described above, since the optical isolator using a photonic crystal according to the present invention can be formed monolithically, an optical arrangement and an assembly process are not needed and the manufacturing process is simple and the manufacturing cost is reduced. Also, since the optical isolator can be formed monolithically with a laser diode or an optical waveguide, the optical isolator can be made compact. Furthermore, the block which is partially blocking the waveguide is provided at the output waveguide of the optical isolator, a backward directional optical signal shield effect can be improved. Also, since the optical isolator according to the present invention can be easily coupled to the optical waveguide or optical fiber, the integration of optical parts is possible.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An optical isolator using a photonic crystal, the optical isolator comprising:
   an input portion including an input waveguide part and an input waveguide having a taper portion formed in the input waveguide part; and
   an output portion including an output waveguide part and an output waveguide formed in the output waveguide part continuously with the input waveguide, the output waveguide comprising a backward directional optical signal shield surface having an inclination greater than the taper portion with respect to an optical signal transmission center axis,
   wherein the optical isolator is operable to have an optical signal substantially transmitted in a forward direction from the input portion to the output portion and further operable to substantially not transmit the optical signal in a backward direction from the output portion to the input portion.

2. The optical isolator as claimed in claim 1, wherein a block having a first surface facing the backward directional optical signal shield surface and a second surface facing a side surface of the output waveguide is arranged at an inlet side of the output waveguide with respect to the forward direction and a narrow waveguide is formed between the backward directional optical signal shield surface and the first surface, and the side surface and the second surface, so that an optical signal proceeding from the input waveguide toward the output waveguide is operable to be guided through the narrow waveguide and an optical signal proceeding from the output waveguide toward the input waveguide is operable to be reflected by the block.

3. The optical isolator as claimed in claim 2, wherein the photonic crystal comprises a plurality of holes or rods and a protruding portion is further provided adjacent to the block, said protruding portion including the holes or rods arranged in a row on the side surface of the output waveguide.

4. The optical isolator as claimed in claim 3, wherein the protruding portion has the same width as that of the narrow waveguide.

5. The optical isolator as claimed in claim 3, wherein the isolation of the isolator is operable to be changed by varying at least one of a radius of a hole or rod of the photonic crystal, an overall length of the isolator, an overall width of the isolator, a refractive index of the photonic crystal, a grid structure of the photonic crystal, an arrangement structure of the hole or rod of the photonic crystal forming the taper portion, a length of the block, a length of a connection waveguide, a width of the connection waveguide, an overall width of a waveguide, a length of the protruding portion, and a width of the protruding portion.

6. The optical isolator as claimed in claim 2, wherein the photonic crystal comprises a plurality of holes or rods and the narrow waveguide has a width that is substantially same as a diameter of each of the holes or rods.

7. The optical isolator as claimed in claim 1, further comprising a connection waveguide between the input waveguide and the output waveguide.

8. The optical isolator as claimed in claim 7, wherein the photonic crystal comprises a plurality of holes or rods and the connection waveguide has a width that is substantially same as a diameter of each of the holes or rods.

9. The optical isolator as claimed in claim 7, wherein the photonic comprises a plurality of holes or rods and the connection waveguide has a length corresponding to three through six holes or rods that are arranged in a row.

10. The optical isolator as claimed in claim 1, wherein the backward directional optical signal shield surface has a tapered shape increasing along the backward direction with respect to the optical signal transmission center axis.

11. The optical isolator as claimed in claim 10, wherein a block having a first surface facing the backward directional optical signal shield surface and a second surface facing a side surface of the output waveguide is arranged at an inlet side of the output waveguide with respect to the forward direction and a narrow waveguide is formed between the backward directional optical signal shield surface and the first surface, and the side surface and the second surface, so that an optical signal proceeding from the input waveguide toward the output waveguide is operable to be guided through the narrow waveguide and an optical signal proceeding from the output waveguide toward the input waveguide is operable to be reflected by the block.

12. The optical isolator as claimed in claim 11, wherein the length of the second surface of the block with respect to a direction in which an optical signal is transmitted is equivalent to a length of five through nine holes or rods of the photonic crystal arranged in a row.

13. The optical isolator as claimed in claim 1, wherein the backward directional optical signal shield surface comprises a plurality of holes or rods of the photonic crystal forming a surface that makes a right angle with respect to the optical signal transmission center axis.

14. The optical isolator as claimed in claim 13, wherein a block having a first surface facing the backward directional optical signal shield surface and a second surface facing a side surface of the output waveguide is arranged at an inlet side of the output waveguide with respect to the forward direction and a narrow waveguide is formed between the backward directional optical signal shield surface and the first surface, and the side surface and the second surface, so that an optical signal proceeding from the input waveguide toward the output waveguide is operable to be guided through the narrow waveguide and an optical signal proceeding from the output waveguide toward the input waveguide is operable to be reflected by the block.

15. The optical isolator as claimed in claim 1, wherein the backward directional optical signal shield surface comprises a plurality of holes or rods of the photonic crystal arranged to have a tapered shape increasing along the forward direction with respect to the optical signal transmission center axis.

16. The optical isolator as claimed in claim 15, wherein a block having a first surface facing the backward directional optical signal shield surface and a second surface facing a side surface of the output waveguide is arranged at an inlet side of the output waveguide with respect to the forward direction and a narrow waveguide is formed between the backward directional optical signal shield surface and the first surface, and the side surface and the second surface, so that an optical signal proceeding from the input waveguide toward the output waveguide is operable to be guided through the narrow waveguide and an optical signal proceeding from the output waveguide toward the input waveguide is operable to be reflected by the block.

17. The optical isolator as claimed in claim 1, wherein the taper portion comprises a plurality of holes or rods of the photonic crystal arranged in a step shape.

18. The optical isolator as claimed in claim 1, wherein isolation of the isolator is operable to be changed by varying at least one of a radius of a hole or rod of the photonic crystal, an overall length of the isolator, an overall width of the isolator, a refractive index of the photonic crystal, a grid structure of the photonic crystal, and an arrangement structure of the hole or rod of the photonic crystal forming the taper portion.

19. The optical isolator as claimed in claim 1, wherein the photonic crystal has a triangular or rectangular grid structure.

20. An optical isolator using a photonic crystal, the optical isolator comprising:
an input waveguide having a taper portion formed in the input waveguide part; and
an output waveguide formed in the output waveguide part continuously with the input waveguide, the output waveguide comprising a backward directional optical signal shield surface,
the optical isolator being operable to have an optical signal substantially transmitted in a forward direction and substantially preventing transmission of the optical signal in a backward direction.

21. The optical isolator of claim 20 wherein the optical signal shield surface has an inclination greater than a taper portion in the input waveguide.

22. The optical isolator of claim 20 further comprising a connection waveguide between the input waveguide and the output waveguide.

23. The optical isolator of claim 20, further comprising a narrow waveguide so that an optical signal proceeding from the input waveguide toward the output waveguide is operable to be guided through the narrow waveguide and an optical signal proceeding from the output waveguide toward the input waveguide is operable to be reflected.

24. The optical isolator of claim 20, wherein the backward directional optical signal shield surface makes a right angle with respect to the optical signal transmission center axis.

25. The optical isolator as claimed in claim 20, wherein the backward directional optical signal shield surface has a tapered shape increasing along the backward direction with respect to the optical signal transmission center axis.

* * * * *